(12) United States Patent
Agbossou et al.

(10) Patent No.: US 6,674,263 B2
(45) Date of Patent: Jan. 6, 2004

(54) CONTROL SYSTEM FOR A RENEWABLE ENERGY SYSTEM

(76) Inventors: Kodjo Agbossou, 280 Père Breton, Cap-de-la-Madeleine, Québec (CA), G8T 2X1; Tapan K. Bose, 3965 rue de Châteaufort, Trois-Rivières, Québec (CA), G8Y 2A8; Sousso Kelouwani, 1110 René-Kimber, Apt. 04, Trois-Rivières, Québec (CA), G8Z 1P9; Rémy Simard, 3140 Talbot, Trois-Rivières, Québec (CA), G8Y 2J5

( * ) Notice: Subject to any disclaimer, the term of this patent is extended or adjusted under 35 U.S.C. 154(b) by 1 day.

(21) Appl. No.: 10/162,208

(22) Filed: Jun. 5, 2002

(65) Prior Publication Data

US 2003/0227276 A1 Dec. 11, 2003

(51) Int. Cl.$^7$ .......................... H01M 10/44; G05F 1/10
(52) U.S. Cl. ..................... 320/101; 307/151; 323/234
(58) Field of Search .......................... 320/101; 307/66, 307/43, 44, 151, 153, 64; 323/207, 234, 282, 284; 429/7, 12, 13, 17, 90; 701/27

(56) References Cited

U.S. PATENT DOCUMENTS

| | | | | | |
|---|---|---|---|---|---|
| 3,850,695 | A | * | 11/1974 | Keller et al. | 429/23 |
| 4,839,574 | A | * | 6/1989 | Takabayashi | 320/101 |
| 5,156,928 | A | * | 10/1992 | Takabayashi | 429/23 |
| 5,177,430 | A | * | 1/1993 | Mohel | 323/284 |
| 5,519,312 | A | * | 5/1996 | Wang et al. | 429/23 |
| 5,637,414 | A | * | 6/1997 | Inoue et al. | 429/13 |
| 6,011,324 | A | * | 1/2000 | Kohlstruck et al. | 307/64 |
| 6,255,008 | B1 | * | 7/2001 | Iwase | 429/9 |
| 6,387,556 | B1 | * | 5/2002 | Fuglevand et al. | 429/22 |
| 6,428,918 | B1 | * | 8/2002 | Fuglevand et al. | 320/101 |

OTHER PUBLICATIONS

Integrated Hydrogen Utility Systems for Remote Northern Communities—Hydrogen Millennium, 17th Canadian Hydrogen Conference(May 28–31, 2000)Glenn D. Rambach, pp. 1–20.

Hydrogen Production by a Windmill Powered Electrolyser, Germany, Menzi et al. pp. 757–765, (1998).

Hybrid Energy Storage Systems for Stand–Alone Electric Power Systems: Optimization of System Performance and Cost through Control Strategies, International Journal of Hydrogen Energy 24 (1999) pp. 1139–1156.

Phoebus–Jülich, An autonomous Energy Supply System Comprising Photovoltaics, Electrolytic Hydrogen, Fuel Cell, Barthels et al., Institute of Energy Process Engineering (IEV), Germany, pp. 1005–1015, (1996).

Phoebue–Jülich: An Autonomous Energy Supply System comprising Photovoltaics, Electrolytic Hydrogen, Fuel Cell, Inst. J. Hydrogen Energy, vol. 23, N° 4, 1998, pp. 295–301, (1998).

Examination of the Design of the Energy Management for the PV Plant, PHOEBUS Jülich by Dynamic Programming, Germany, Pötter et al., pp. 1185–1190, (1998).

Investigation of Techno–Economical Performance of Using Hydrogen Storage with Integrated Renewable Energy Systems, Ibrahim et al., Mech. Eng. Dept., National Research Centre (NRC), Egypt, pp. 2055–2060, (1996).

Evaluation of a 5 kW, Photovoltaic Hydrogen Production and Storage Installation for a Residential Home in Switzerland, Hullmuller et al., Centre d'Études des Problèmes de l'Énergie and Laboratoire de Cristallographie, Switzerland, pp. 423–443, (1992).

* cited by examiner

Primary Examiner—Pia Tibbits
(74) Attorney, Agent, or Firm—C. Marc Benoît; Ogilvy Renault

(57) ABSTRACT

A renewable energy (RE) system is disclosed which comprises an energy source providing unit, a DC bus, a buck converter, an hydrogen generator, an hydrogen storage, an energy conversion device, a boost converter, a DC to AC converter, and a monitoring system.

21 Claims, 6 Drawing Sheets

→ Energy conversion operation cycle;
⋯▶ Hydrogen generator operation cycle;

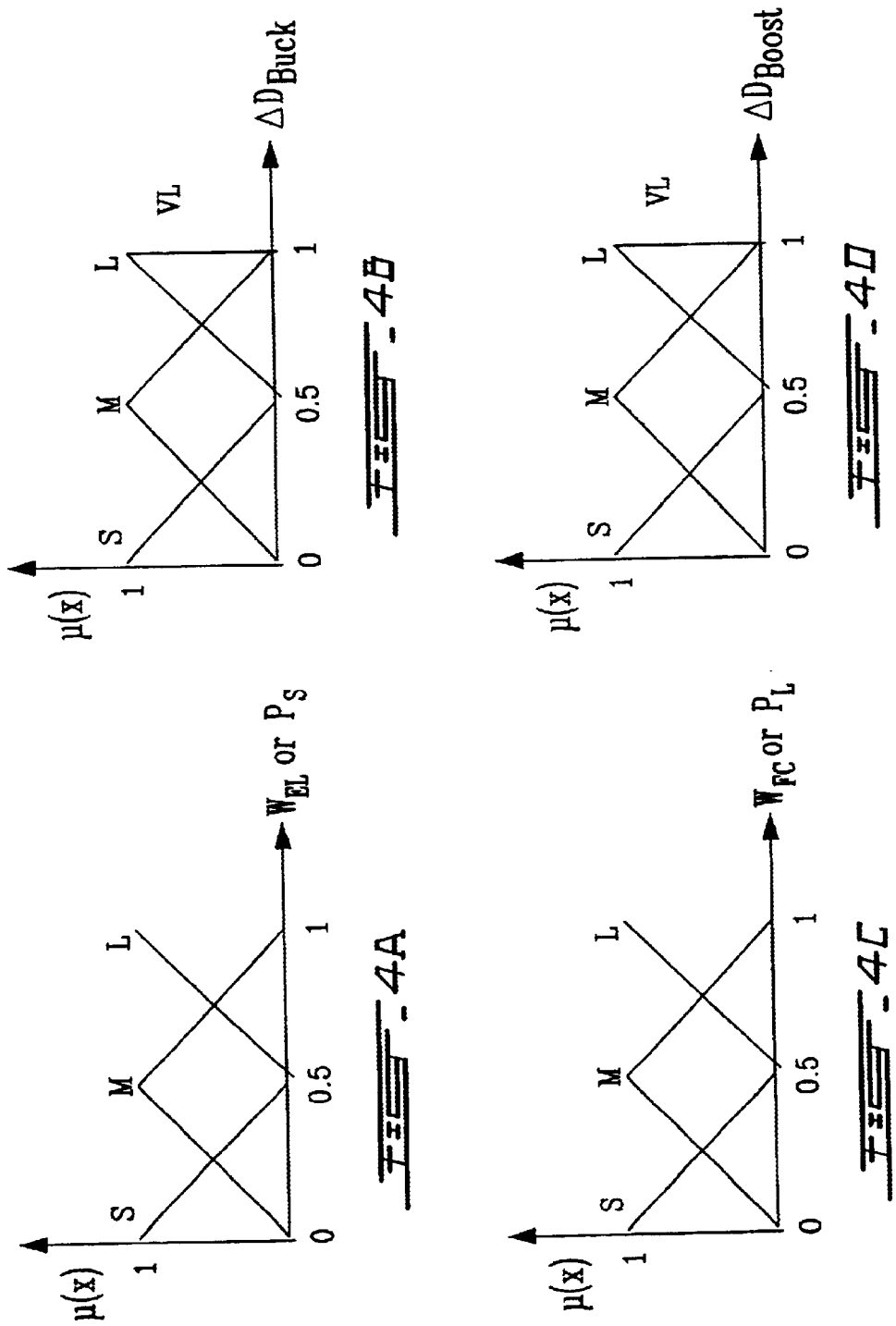

| | $W_{EL}(n) = W(n) - W_m$ (normalized) | | |
|---|---|---|---|
| | L | M | S |
| $P_S(n) = I_S(n) \cdot E(n)$ (normalized) | L | VL | L | M |
| | M | L | M | S |
| | S | M | S | S |

FIG. 5

CONTROL SYSTEM FOR A RENEWABLE ENERGY SYSTEM

CROSS-REFERENCE TO RELATED APPLICATIONS

This is the first application filed for the present invention.

TECHNICAL FIELD

This invention relates to the field of stand-alone renewable energy sources. More precisely, this invention relates to the field of renewable energy sources using hydrogen.

BACKGROUND OF THE INVENTION

The last few years have seen the development of renewable energy (RE) systems, mainly wind-based and/or solar-based systems. These renewable energy systems are intended to help fighting against energy pollution and resource depletions.

A major issue in the renewable energy (RE) systems is the increase of the efficiency of energy conversion systems in order to optimize the use of currently available energy sources and at the end the extend to the use of other energy vectors.

Such systems are especially relevant to off-grid communities, usually located in remote areas (G. D. Rambach, "Integrated hydrogen utility systems for remote northern communities", 10$^{th}$ Canadian Hydrogen Conference, Quebec, Canada, May 2000; T. K. Bose, K. Agbossou, P. Bénard, J. M. St-Arnaud, "Nouvelles perspectives des systémes à énergies renouvelables basés sur l'hydrogéne". 15$^e$ Conférence et exposition de l'Association canadienne d'énergie éolienne, Rimouski—Canada, September 1999.).

These renewable energy (RE) systems are highly transient energy sources and exhibit strong variations in their energy outputs. Thus, they require proper means to store the energy produced in period of low demand in order to stabilize the output when the demand is high. At present, the storage of the excess energy relies mostly on batteries (Fisher, Jr., "Apparatus and method for charging an energy storage source", U.S. Pat. No. 6,194,793, Feb. 27, 2001; S. Mituo, S. Tsutomu, O. Hidekiyo, M. Hisafumi, "Power supply apparatus for efficiently utilizing battery and electronic apparatus using the power supply", U.S. Pat. No. 5,610,450, Jun. 29, 1995; T. O. Kent, B. Arthur J., "Method of power management for a hybrid powertrain system", U.S. Pat. No. 5,999,864, Apr. 23, 1997). Batteries typically lose 1–5% of their energy content per month.

A better approach for excess energy storage is to produce hydrogen and store it in a clean renewable form (S. R. Vosen, J. O. Keller, "Hybrid energy storage systems for stand-alone electric power systems: optimization of system performance and cost through control strategies", International Journal of Hydrogen Energy, vol. 24, 1999, p. 1139–1156; F. Menzl, M. Wenske, J. Lehmann, "Hydrogen production by windmill powered electrolyser", Hydrogen Energy Progress XII, vol. 1, 1998, p. 757–765; R. Potter, R. Pruschek, "Examination of the design of the energy management for the PV plant PHOEBUS Jülich by dynamic programming", Hydrogen Energy Progress XI, vol. 2, 1996, p.1185–1190).

An energy conversion device, such as a hydrogen fuel cell or an internal combustion engine (ICE) coupled with a co-generator can be used to convert back into electricity and heat (H. Barthels, W. A. Brocke, K. Bonhoff at al., "PHOEBUS Jülich: An autonomous energy supply system comprising photovoltaic, electrolytic hydrogen, fuel cell", Hydrogen Energy Progress XI, vol. 2, 1996, p. 1005–1015; M. I. Ibrahim, A. A. Elmallah, M. H. Badr, A. S. Hanafi "Investigation of techno-economical performance of using hydrogen storage with integrated renewable energy systems", Hydrogen Energy Progress XI, vol. 2, 1996, p. 2055–2060; Saeki Mituo, Suzui Tsutomu, Ozawa Hidekiyo, Mitsui Hisafumi "Power-supply apparatus for efficiently utilizing battery and electronic apparatus using the power supply", U.S. Pat. No. 5,999,864, Apr. 23, 1997; P. Hollmuller, J. M. Joubert, B. Lachal, K. Yvon, "Evaluation of a 5 kW$_F$ photovoltaic hydrogen production and storage installation for a residential home in Switzerland", Hydrogen Energy Progress XII, vol. 1, 1998, p. 423–443). The hydrogen produced, in excess of the system's requirement, can be used to power other systems or in case of large-scale systems, it could be exported for use in the process industry.

There is a need for an apparatus that will overcome the limitations of the renewable energy system from the prior art.

SUMMARY OF THE INVENTION

It is an object of the invention to provide an apparatus for controlling a renewable energy system based on hydrogen.

It is another object of the invention to provide a method for providing stability in a two-independent-variable environment.

Yet another object of the invention is to provide a method for controlling power in a renewable energy system based on hydrogen.

According to a first aspect of the invention, there is provided an energy stand-alone supply providing electrical power to a load having an electrical power need using an energy supply source providing a source electrical power, wherein a time-variable discrepancy between said source electrical power provided by said energy supply source and said electrical power need, the energy stand-alone supply maintaining the provided electrical power between two values, the energy stand-alone supply comprising a buffer receiving a source electrical power from an energy supply, the buffer further providing electrical power to a load according to an electrical power need of said load, a first power converter connected to said buffer and providing a converted electrical power using at least one part of the source electrical power in response to a first control signal, a hydrogen generator receiving said converted electrical power and generating hydrogen using said provided converted electrical power, a hydrogen storage storing the generated hydrogen provided by said hydrogen generator, a hydrogen conversion device receiving at least one part of said hydrogen of said hydrogen storage and providing a generated electrical power in response to a second control signal, a second converter receiving said generated electrical power and providing a converted electrical power of the generated electrical power to said buffer and a control unit providing said first and second signal, the control unit enabling the maintaining of the provided electrical power between the two values according to a control scheme.

According to a second aspect of the invention, there is provided a method for providing electrical power to a load having an electrical power need using an energy supply and maintaining the provided electrical power between two values, wherein a time-variable discrepancy exists between said electrical power provided by said energy supply and said electrical power need of the load, the method comprising the steps of measuring an electrical power need of a load and an available electrical power of an energy supply, comparing said electrical power need of the load to said available electrical power of the energy supply to provide a comparison value, if said comparison value is larger than a first predetermined value, operating a hydrogen conversion device to provide extra electrical power using hydrogen stored in a hydrogen storage, the operating increasing the available electrical power, the operating being performed until said available electrical power reaches the electrical power need of the load, if said electrical power need of the load is lower with respect to said available electrical power of the energy supply by a second predetermined value, switching on a hydrogen generator, the switching on of the hydrogen generator providing hydrogen to the hydrogen storage, the switching on decreasing the available electrical power, the switching on being performed until said available electrical power reaches the electrical power need of the load, whereby the operating of the hydrogen generator and the switching on of the hydrogen conversion device enable the maintaining of the available electrical power between the two predetermined values.

BRIEF DESCRIPTION OF THE DRAWINGS

Further features and advantages of the present invention will become apparent from the following detailed description, taken in combination with the appended drawings, in which:

FIG. 4a is a plot which shows membership functions $\mu(x)$ of the fuzzy logic controller inputs $W_{EL}$ or $P_S$ in the case of a fuzzy logic control of the hydrogen generator;

FIG. 4b is a plot which shows membership function $\mu(x)$ of the output $D_{Buck}$ of the fuzzy logic controller (FLC) in the case of a fuzzy logic control of the hydrogen generator;

FIG. 4c is a plot which shows membership functions $\mu(x)$ of the inputs $W_{FC}$ or $P_L$ of the fuzzy logic controller in the case of a fuzzy logic control of the energy conversion device;

FIG. 4d is a plot which shows membership function $\mu(x)$ of the output $D_{Boost}$ of the fuzzy logic controller in the case of a fuzzy logic control of the energy conversion device;

FIG. 5 shows fuzzy rules that are used by the FLC to control hydrogen generation;

It will be noted that throughout the appended drawings, like features are identified by like reference numerals.

DETAILED DESCRIPTION OF THE PREFERRED EMBODIMENT

Figure 1:
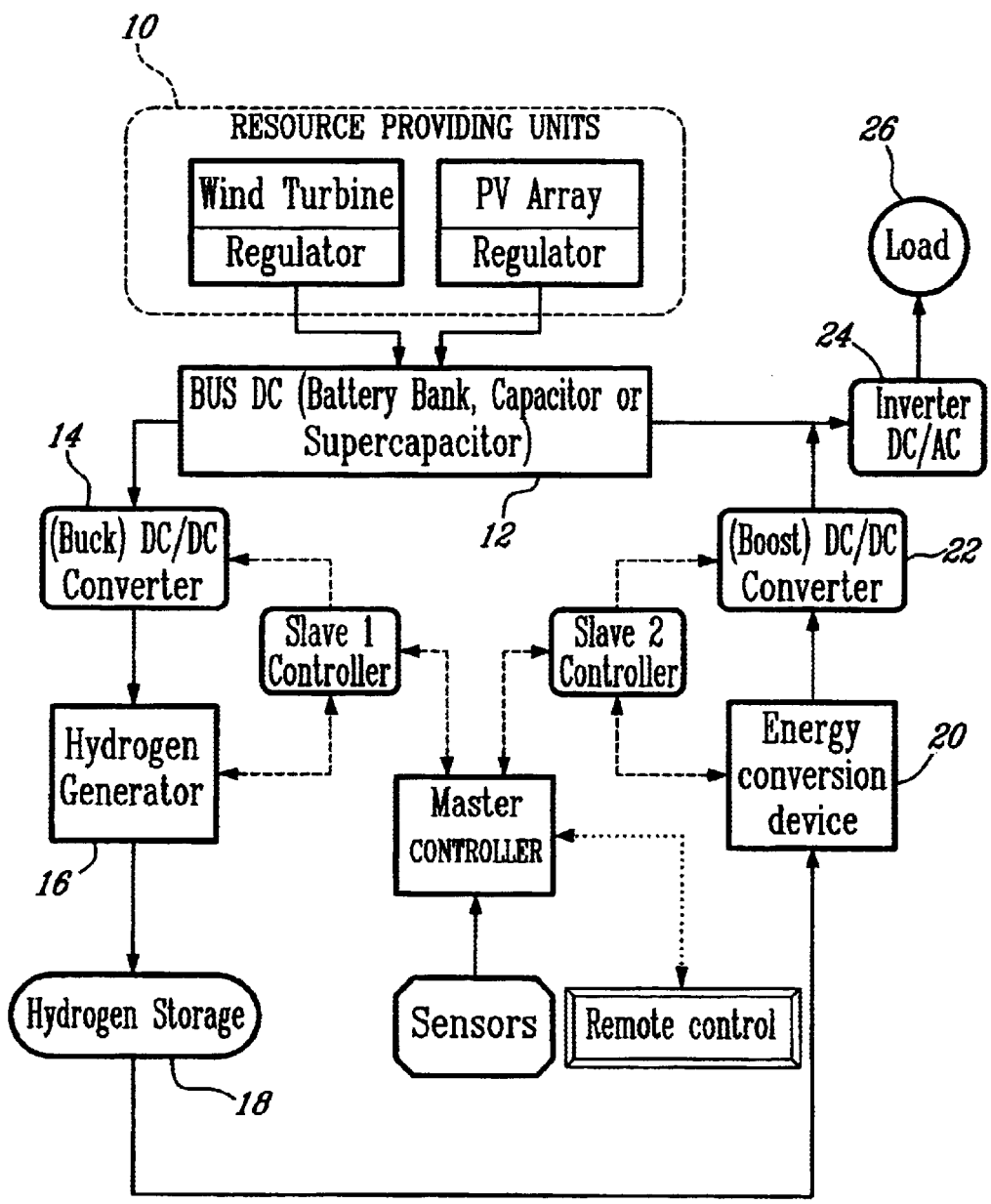
FIG. 1 is a block diagram which shows a renewable energy system according to the preferred embodiment of the invention; the renewable energy system comprises an hydrogen storage which is used to store energy.

Now referring to FIG. 1, there is shown a renewable energy (RE) system according to the preferred embodiment of the invention. It will be appreciated that many other embodiments of the invention are possible and the present embodiment is only an example.

The renewable energy (RE) system comprises an energy source providing unit 10, a DC bus 12, a buck converter 14, an hydrogen generator 16, an hydrogen storage 18, an energy conversion device 20, a boost converter 22, a DC to AC converter 24 and a load 26.

The energy source providing unit 10 provides DC electrical power from a renewable energy source using a renewable source generator. In one embodiment of the invention, the renewable source generator comprised in the energy source providing unit 10 is a wind turbine. In another embodiment, the renewable source generator comprised in the energy source providing unit 10 is a photovoltaic array.

The energy source providing unit 10 further comprises a regulator or a rectifier that converts electrical power provided by the renewable source generator into the DC electrical power.

The DC bus 12 receives the DC electrical power from the energy source providing unit 10. In the preferred embodiment, the DC bus 12 acts as a buffer for short time energy requirement. In the preferred embodiment, the DC bus 12 is either rechargeable batteries or a plurality of capacitors or a supercapacitor. A supercapacitor is an electrochemical capacitor that is built much like a battery.

The buck converter 14 is connected to the DC bus 12 and to the hydrogen generator 16. The buck converter 14 acts as a power interface. Alternatively, the buck converter 14 can be integrated in the hydrogen generator 16.

The hydrogen generator 16 generates hydrogen in response to power coming from the buck converter 14. The energy flow can therefore be controlled as per demand or dependently on excess available energy the system wants to flow to the hydrogen generator.

The hydrogen storage 18 comprises the hydrogen, generated by the hydrogen generator 16, a gas compressor and a storage vessel or tank.

The energy conversion device 20 generates electrical power using hydrogen stored in the hydrogen storage 18. In one embodiment, the energy conversion device 20 is a fuel cell (FC); in another embodiment, the energy conversion device 20 is an internal combustion engine (ICE) added to a co-generator or an alternator with a rectifier module.

The internal combustion engine uses hydrogen as fuel to generate electrical energy. The excess electrical energy produced from renewable sources can therefore be stored effectively in the form of hydrogen. Hydrogen on its turn can be reconverted to electricity by the use of fuel cell or a combination of internal combustion engine coupled with a co-generator.

A boost converter 22 receives the electrical power from the energy conversion device 20 and provides DC electrical power to the DC bus 12.

The DC to AC converter 24 is connected to the DC bus 12 and provides an AC power to a load in the preferred embodiment.

In the preferred embodiment, the buck converter 14 and the boost converter 22 are software-controlled. Still in the preferred embodiment, the buck converter 14 operates using a multiphase switching technique or any chopper technique and a digital command to reduce the ripple associated to the operating of such device. Still in the preferred embodiment, a numerical approach is used to generate or drive the pulse width modulation (PWM) pattern for the buck converter 14.

An EEPROM is preferably used to store the pulse width modulation signals and delays. A binary counter and an independent asynchronous numerical interface is used to address the EEPROM. Alternatively, any type of memory may be used instead of the EEPROM.

Control of the Renewable Energy System

As described previously and shown in FIG. 1, the DC bus 12 is a key element as it receives the DC electrical power from the boost converter 22; it further receives the DC electrical power from the energy source providing unit 10; furthermore, the DC bus 12 provides DC electrical power to the buck converter 14 and to the DC to AC converter 24.

The DC bus 12 is characterized by a voltage and a current.

It will be appreciated that three situations may occur.

A first situation is defined as when the DC electrical power in the DC bus 12 provided by the energy source providing unit 10 is too low to suit a load power consumption needs of the load connected to the DC bus 12 via the DC to AC converter 24. In such situation, the DC electrical power required by the load is higher than the power generated by the energy source providing unit 10. There is a need for power that has to be supplied.

A second situation is when the load power consumption is lower than the DC electrical power generated by the energy source providing unit 10. In such a situation, there is a surplus of DC electrical power that should be stored in hydrogen form.

A third situation is when the difference between the DC electrical power generated by the energy source providing unit 10 and the load power consumption is substantially small.

A State Of Charge (SOC) of the DC bus 12 is defined as $$SOC = \frac{Q_{IN}}{Q_{FC}},$$

wherein $Q_{IN}$ is at least one battery accumulated charge and $Q_{FC}$ is at least one battery capacity.

When the DC electrical power generated by the energy source providing unit 10 is insufficient to cover a load power consumption, i.e. when the renewable energy system is in the first situation, power is taken from the at least one battery causing a decrease of the state of charge.

When the DC electrical power generated by the energy source providing unit 10 is higher than the load power consumption, i.e. when the renewable energy system is in the second situation, and when considering that the hydrogen generator 16 is not working, the at least one battery are charging causing an increase of the state of charge.

It is therefore advantageous to monitor the state of charge in order to control the renewable energy system.

Since $Q_{IN}(t)$ is related to the battery energy $W(t)$ by $W(t)=V(t) \cdot Q_{IN}(t)$, the DC bus 12 state is defined by buffer energy $W(t)$ which is controlled according to the preferred embodiment of the invention.

In one embodiment of the invention, a first and a second control unit are used to control the renewable energy system. Alternatively, a single control unit may be used to control the renewable energy system.

Preferably, and as shown in FIG. 1, a first and a second slave controller are used to control the renewable energy system. The first and the second slave controller are controlled by a master controller receiving data from sensors. Still in the preferred embodiment of the invention, a remote control is used to monitor and operate the master controller. The first and the second slave controller may be implemented using a micro-controller or a Digital Signal Processor (DSP).

Figure 2:
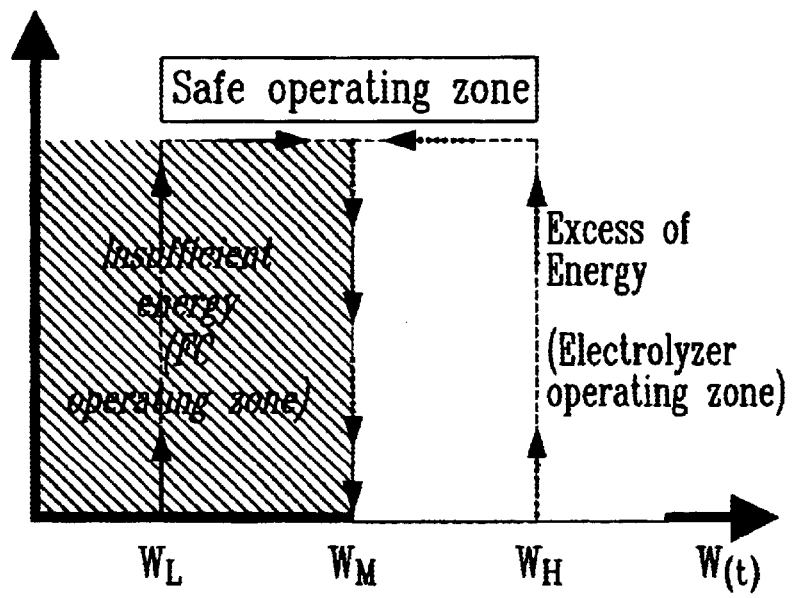
FIG. 2 is a diagram which shows operation of hydrogen generator and energy conversion device, when double hysteresis control is used; the diagram also shows three states of the renewable energy system.

Now referring to Fig. 2, there is shown how the renewable energy system is controlled in the preferred embodiment of the invention.

As shown in FIG. 2, there are two zones; a first zone is defined when there is an insufficient amount of buffer energy i.e. when $W(t)<W_M$. A second zone is defined when there is an excess of buffer energy i.e. when $W(t)>W_M$.

Still referring to FIG. 2, there are shown $W_L$ and $W_H$. $W_L$ is defined as a minimum energy threshold that allows the start of hydrogen conversion by hydrogen conversion device 20 while $W_H$ is defined as a maximum energy threshold that allows the start of hydrogen generation by hydrogen generator 16.

Still referring to FIG. 2, the values of $W_L$ and $W_H$ are defined according to a weather prevision algorithm; thus if there will be just wind, the diagram will be shifted to the right of FIG. 2 in order to allow a direct use of renewable energy from the energy source providing unit 10 by the load 26 and in order to reduce the probability of using the energy conversion device 20.

A safe operating zone is defined as $W_L \leq W(t) \leq W_H$. In this zone, there is an energy equilibrium between power generation and consumption over the whole system.

Therefore, the goal of controlling the renewable energy system is to maintain the buffer energy $W(t)$ of the renewable energy system between $W_L$ and $W_H$ in the preferred embodiment of the invention.

In the preferred embodiment, the power transfer is made with a great precision as per demand or dependently on excess available energy, the system want to flow to the hydrogen generator.

Double Hysteresis Controlling Scheme

Still referring to FIG. 2, there is shown a first embodiment of the invention.

If $W(t)>W_H$, i.e. if the buffer $W(t)$ is higher than the maximum power threshold, the hydrogen generator 16 is switched on, producing hydrogen that will be provided to the hydrogen storage 18 for storage. While producing the hydrogen, the buffer energy $W(t)$ will decrease. The hydrogen generator 16 will be switched off when the buffer energy $W(t)$ will reach a predefined value $W_M$, defined as:

$$W_M = \frac{W_L + W_H}{2}$$

If $W(t)<W_H$, i.e. if the buffer energy $W(t)$ is lower than the maximum power threshold, the energy conversion device 20 is switched on, producing power that will be provided to the DC bus 12 using hydrogen from the hydrogen storage 18 and via the boost converter 22. Because of the producing of electrical power, the buffer energy $W(t)$ will increase. The energy conversion device 20 will be switched off when the buffer energy $W(t)$ will reach the predefined value $W_M$.

Two hysteresis cycles are therefore followed according to the preferred embodiment of the invention; the first one is defined for the control of the hydrogen generator 16; the second one is defined for the control of the energy conversion device 20.

When the energy conversion device 20 and the hydrogen generator 16 are switched off and when $W_L \leq W(t) \leq W_H$, there is an equilibrium between the DC electrical power provided to the DC bus 12 by the energy source providing unit 10 and the DC electrical power required by the load connected to the DC to AC converter 24.

Double Hysteresis Controlling Scheme With Local PI or PID Controller

As explained below and shown in FIG. 3a, a first and a second proportional integral (PI) controller may be used to control the buck converter 14 and the boost converter 22.

There is a need for bringing an efficient transfer of power in the case that the system does not support large power ripples. In this particular case, it is important to regulate power going to the hydrogen generator 16 and the power coming from the energy conversion device 20.

In the preferred embodiment of the invention, the control of the hydrogen generator 16 and the energy conversion device 20 are, de facto, managed independently.

Figure 3A:
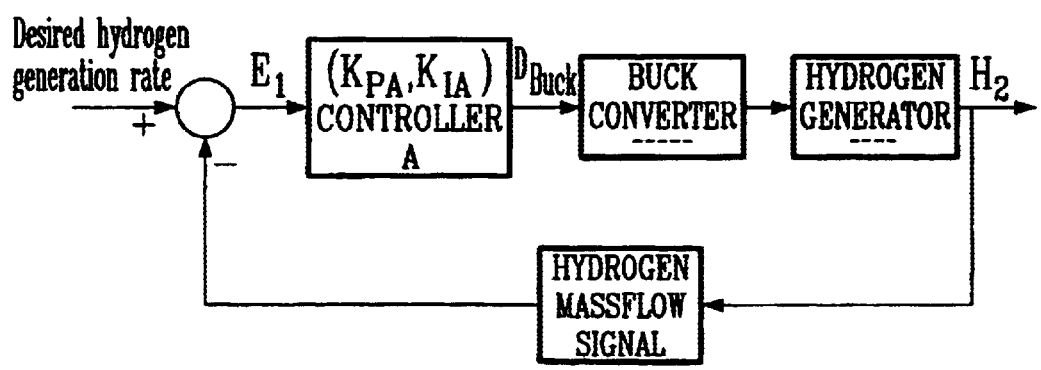
FIG. 3a shows a control block diagram for control of the hydrogen generator; the control is performed using a negative feedback loop.

Now referring to FIG. 3a, there is shown how the hydrogen generator 16 and the buck controller 14 are controlled using a first controller A.

As will note someone skilled in the art, a negative feedback control scheme is used. In this embodiment, the first controller A is a proportional integral (PI) controller or a proportional integral derivative (PID) controller. In the case that the system response time is not critical, a proportional integral (PI) controller will be used.

Figure 3B:
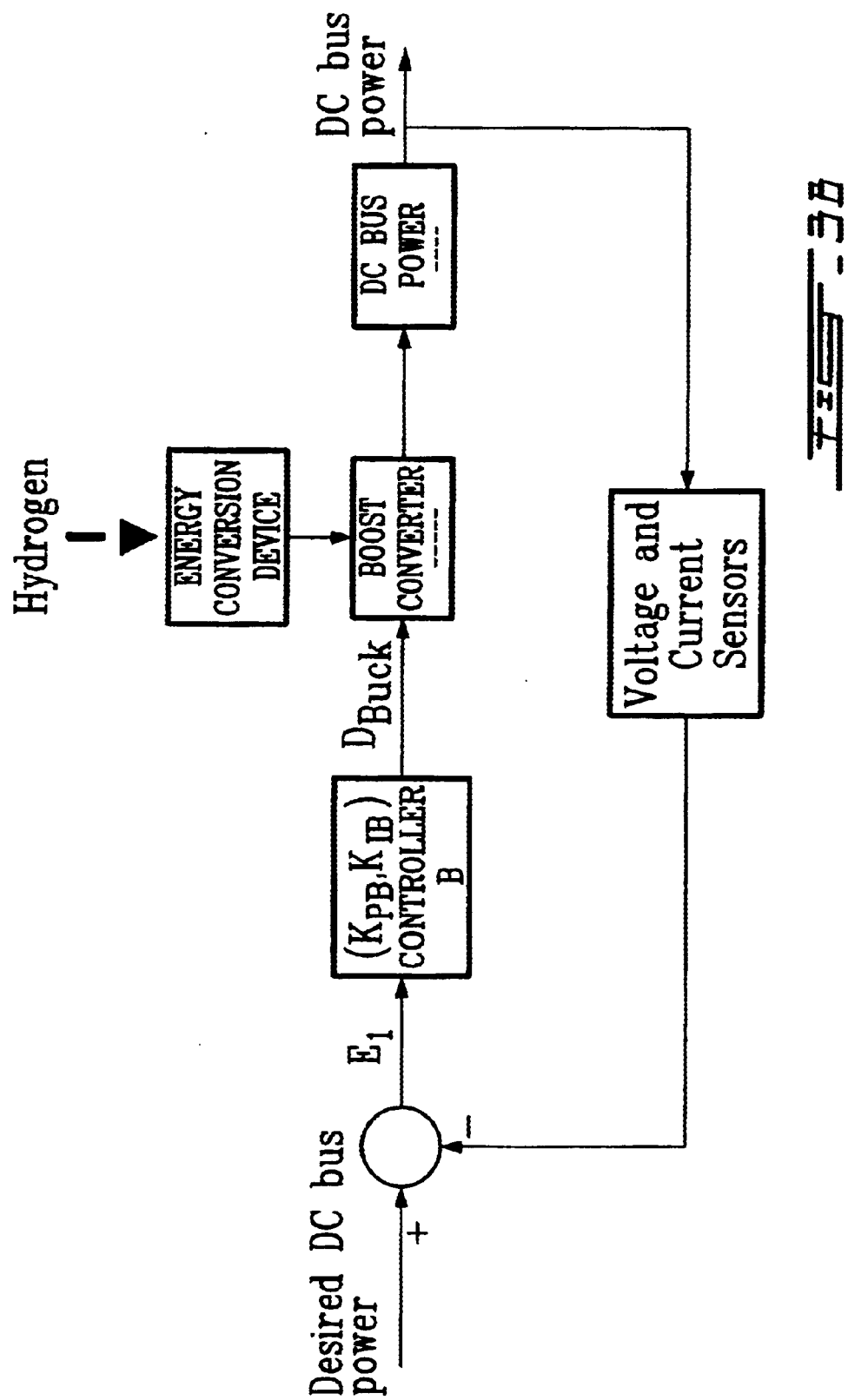
FIG. 3b shows a control block diagram for control of the energy conversion device; the control is performed using a negative feedback loop.

Now referring to FIG. 3b, there is shown how the energy conversion device 20 and the boost converter 22 are controlled using a second controller B.

As per the control of the hydrogen generator 16 and the buck controller 14, a negative feedback control scheme is used. In this embodiment, the second controller B is a proportional integral-type controller.

In this embodiment, $K_{PA}$ and $K_{IA}$ are defined as proportional coefficient and integral coefficient of the first controller A. $K_{PB}$ and $K_{IB}$ are defined as proportional coefficient and integral coefficient of the second controller B.

Still in the preferred embodiment of this control scheme, $K_{PA}$ and $K_{IA}$ as well as $K_{PB}$ and $K_{IB}$ are chosen according to a pole/zero-placing scheme.

A numerical proportional integral-type controller is determined using a trapezoidal approximation of the integral. In order to limit output of each of the two controllers, a saturation unit has been added in the preferred embodiment of the invention as shown below. The duty cycle of the buck converter ($D_{Buck}$) is generated by the first controller A using the following equation.

$$D_{Buck}(n) = D_{Buck}(n-2) + \left(K_{PA} + \frac{K_{IA}}{A}\right) \cdot E(n) +$$
$$K_{IA} \cdot E(n-1) + \left(-K_{PA} + \frac{K_{IA}}{2}\right) \cdot E(n-2)$$

E(n) is defined as the deviation between the desired hydrogen generation rate and a feedback hydrogen massflow signal from the hydrogen generator as shown on FIG. 3A.

The saturation unit comprised in the first controller A operates as follows:

If $D_{Buck}(n) > 1$ then $D_{Buck}(n) = 1$ and

If $D_{Buck}(n) < 0.75$ then $D_{Buck}(n) = 0.75$.

The value of 0.75 is chosen in the preferred embodiment; 36V are required by the hydrogen generator 16 when the DC bus 12 voltage is 48V.

Someone skilled in the art will be able to define the properties of the second controller B. The output of the second controller B, $D_{Boost}$ is defined by:

$$D_{Boost}(n) = D_{Boost}(n-2) + \left(K_{PB} + \frac{K_{IB}}{2}\right) \cdot E(n) +$$
$$K_{IB} \cdot E(n-1) + \left(-K_{PB} + \frac{K_{IB}}{2}\right) \cdot E(n-2)$$

Fuzzy Logic-Based Controller

In this embodiment, a surplus of DC electrical power as well as a deficit of DC electrical power are taken into consideration in order to set the level of power for the energy conversion device 20 and the hydrogen generator 16.

In this embodiment, two fuzzy logic-based controllers are designed. The first fuzzy logic-based controller is dedicated for the control of the buck converter 14 and the hydrogen generator 16 while the second fuzzy logic controller is dedicated for the control of the energy conversion device 20 and the boost converter 22.

The first fuzzy logic-based controller will take into consideration W(t) as well as the electrical power generated by the energy source providing unit 10. The second fuzzy logic-based controller will use W(t) and a true electrical power need of the load 26 as control parameters.

Input Variables and Output Variables Definition

In the preferred embodiment of this first fuzzy logic-based controller, a first input variable is $W_{EL}(n) = W(n) - W_M$, wherein W(n) is a sample of W(t) and $W_M$ is a threshold where the hydrogen generator 16 stops. A second input variable is $P_S(n) = I_S(n) \cdot E(n)$, wherein $I_S(n)$ is a sample of the total current originating from the renewable energy source providing unit 10 and E(n) is a sample of the voltage of the DC bus 12.

The output variable of the first fuzzy logic-based controller, $D_{Buck}(n)$ is the duty cycle of the buck converter 14.

$D_{Buck}(n) = 0.75 + \rho \cdot \Delta D_{Buck}(n)$, wherein $\Delta D_{Buck}(n)$ is the result of the defuzzification and ρ relates to a coefficient. The minimum duty cycle is 0.75 which is the ratio between the minimum voltage required for hydrogen generation (36V in the preferred embodiment) and the DC bus nominal voltage (48V in the preferred embodiment). Still in the preferred embodiment, all variables are normalized. The variables vary therefore from 0 to 1.

Linguistic Variables

Input variables are expressed using the following linguistic variables: Large (L), Medium (M) and Small (S); moreover Very Large (VL) is added at the output variable $\Delta D_{Buck}(n)$.

Fuzzification

In the preferred embodiment, triangular membership functions are used with the first fuzzy logic-based controller.

Now referring to FIGS. 4a and 4b, there are shown the membership functions of $W_{EL}$ and $P_S$ and $D_{Buck}$.

Now referring to FIGS. 4c and 4d, there are shown the membership functions of $W_{FC}$ or $P_L$ and $D_{Boost}$.

Now referring to FIG. 5, there is shown Fuzzy inference rules for the first fuzzy logic-based controller.

Defuzzification

In the preferred embodiment of the invention a method based on gravity center determination is used in order to produce a discrete value.

Figure 6:
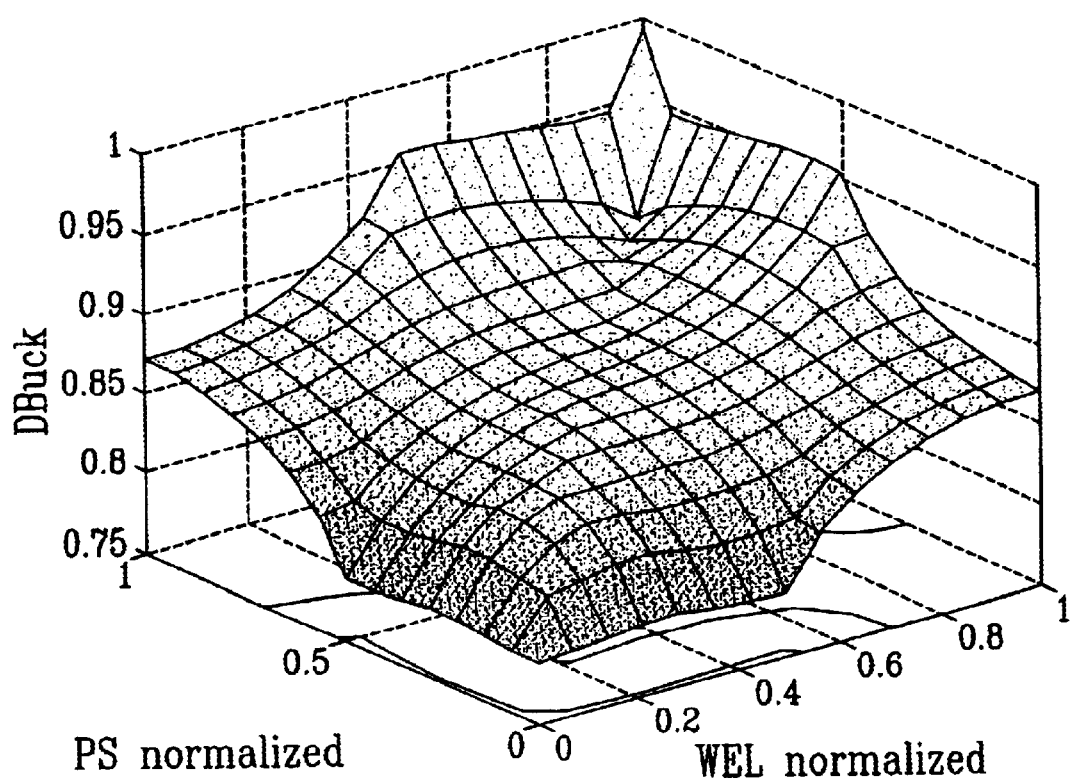
FIG. 6 shows a 3D representation of the FLC output according to different values of $W_{EL}$ and $P_S$.

Now referring to FIG. 6, there is shown a 3D representation of $D_{Buck}$ according to values of $W_{EL}$ and $P_S \cdot \rho$ is set at 0.2439 so that when the fuzzy logic controller output $\Delta D_{Buck}$ (n) is maximum (i.e.~1), $D_{Buck}$ is also maximum (i.e. ~1). A minimal value of $\Delta D_{BUCK}$ is 0.2, which implies that the minimum value of $D_{BUCK}$ is equal to 0.77.

The second fuzzy logic controller which is dedicated for the control of the energy conversion device 20 and the boost converter 22 may be easily designed by someone skilled in the art according to the steps used for the designing of the first fuzzy logic controller. In this case, the fuzzy logic controller output is $\Delta D_{Boost}$.

$D_{Boost}(n) = \beta \Delta D_{Boost}(n)$, wherein $\Delta D_{Boost}(n)$ is the result of the defuzzification, $D_{Boost}(n)$ is the boost converter duty cycle and $\beta$ relates to a coefficient. $\beta$ is set so that $D_{Boost}(n) \approx 0.5$ when $\Delta D_{Boost}(n) \approx 1$.

In an alternate embodiment, the energy source providing unit 10 of the renewable energy (RE) system may be a generator originating from a power plant. The power plant may be a nuclear power plant, delivering a substantially constant energy power and facing fluctuations in energy demand.

We claim:

1. An energy stand-alone supply providing electrical power to a load having an electrical power need using an energy supply source providing a source electrical power, wherein a time-variable discrepancy between said source electrical power provided by said energy supply source and said electrical power need, the energy stand-alone supply maintaining the provided electrical power between two pre-determined, the energy stand-alone supply comprising:
   a buffer receiving a source electrical power from an energy supply, the buffer further providing electrical power to a load according to an electrical power need of said load;
   a first power converter connected to said buffer and providing a converted electrical power using at least one part of the source electrical power in response to a first control signal;
   a hydrogen generator receiving said converted electrical power and generating hydrogen using said provided converted electrical power;
   a hydrogen storage storing the generated hydrogen provided by said hydrogen generator;
   a hydrogen conversion device receiving at least one part of said hydrogen of said hydrogen storage and providing a generated electrical power in response to a second control signal;
   a second converter receiving said generated electrical power and providing a converted electrical power of the generated electrical power to said buffer;
   a control unit providing said first and second signal, the control unit enabling the maintaining of the provided electrical power between the two pre-determined according to a control scheme.

2. The apparatus as claimed in claim 1, wherein the buffer is a battery.

3. The apparatus as claimed in claim 1, wherein the buffer is a capacitor.

4. The apparatus as claimed in claim 1, wherein the hydrogen conversion device is an ICE coupled with a co-generator.

5. The apparatus as claimed in claim 1, wherein the buffer is a DC bus.

6. The apparatus as claimed in claim 1, wherein the energy supply source comprises a wind turbine.

7. The apparatus as claimed in claim 1, wherein the energy supply source comprises at least one photovoltaic array.

8. The apparatus as claimed in claim 1, further comprising a memory and an addressing unit, the memory comprising at least more than one pulse width modulation signals in order to drive the first controller.

9. The apparatus as claimed in claim 8, wherein the addressing unit comprises a binary counter and an interface to select at least one of said more than one pulse width modulation signals.

10. The apparatus as claimed in claim 1, further comprising the control unit providing the first and the second control signals, the control unit comprising at least one sensor for sensing the electrical power of said buffer and the electrical power need of the load.

11. The apparatus as claimed in claim 1, further comprising a first control unit providing the first control signal, the first control unit comprising sensors for sensing the electrical power of said buffer and the electrical power need of the load; the apparatus further comprising a second control unit providing the second control signal, the second control unit comprising sensors for sensing the electrical power of said buffer and the electrical power need of the load.

12. The apparatus as claimed in claim 11, wherein the first and the second control unit comprises a micro-controller.

13. The apparatus as claimed in claim 11, wherein the first and the second control unit comprises a digital signal processor (DSP).

14. The apparatus as claimed in claim 11, wherein each control unit is implemented using a hysteresis scheme.

15. The apparatus as claimed in claim 11, wherein each control unit is implemented using a fuzzy-logic scheme.

16. The apparatus as claimed in claim 11, wherein each control unit is implemented using a PI-type or PID-type controller.

17. The apparatus as claimed in claim 1, further comprising a remote control connected to said control unit.

18. A method for providing electrical power to a load having an electrical power need using an energy supply and maintaining the provided electrical power between two pre-determined values, wherein a time-variable discrepancy exists between said electrical power provided by said energy supply and said electrical power need of the load, the method comprising the steps of:
   measuring an electrical power need of a load and an available electrical power of an energy supply;
   comparing said electrical power need of the load to said available electrical power of the energy supply to provide a comparison value;
   if said comparison value is larger than a first predetermined value, operating a hydrogen conversion device to, provide extra electrical power using hydrogen stored in a hydrogen storage, thereby increasing the available electrical power, the operation being performed until said available electrical power reaches the electrical power need of the load;
   if said electrical power need of the load is lower with respect to said available electrical power of the energy supply by a second predetermined value, switching on a hydrogen generator, that provides hydrogen to the hydrogen storage, thereby decreasing the available electrical power, the switching on being performed until said available electrical power reaches the electrical power need of the load.

19. The method as claimed in claim 18, further comprising the step of modifying the two predetermined values.

20. The apparatus as claimed in claim 1, wherein the energy supply source is an energy surplus generated by a power plant.

21. The method as claimed in claim 18, wherein said energy supply is an energy surplus provided by a power plant.

* * * * *